United States Patent Office
3,507,809
Patented Apr. 21, 1970

3,507,809
PREPARATION OF EPOXIDATION CATALYST SOLUTION
John Kollar, Wyckoff, N.J., assignor to Halcon International, Inc., a corporation of Delaware
No Drawing. Filed Jan. 3, 1967, Ser. No. 606,535
Int. Cl. C07d 1/08
U.S. Cl. 252—429                        1 Claim

ABSTRACT OF THE DISCLOSURE

The present invention pertains to the preparation of a catalyst solution by reacting a catalyst metal in the elemental form or in the form of an inorganic compound with a liquid aralkyl hydroperoxide in the substantial absence of olefinically unsaturated compounds. The catalyst solution which results is particularly useful in the production of oxirane compounds.

BACKGROUND OF THE INVENTION

Field of the invention

The present invention pertains to the preparation of catalyst solutions by incorporating inorganic and elemental forms of certain catalysts in an aralkyl hydroperoxide in order to produce a catalyst solution which is useful in the production of oxirane compounds. The invention also relates to the use of the catalyst solution in the production of oxirane compounds.

The prior art

No prior art is known of which pertains to the preparation of the catalyst solutions as set forth in the present invention. Insofar as the production of oxirane compounds using organic hydroperoxides is concerned, reference may be made to Belgian Patents 663,859; 665,082; 644,090; and 657,838 which describe reactants conditions and catalytic materials in great detail. A problem which has plagued the art has been the cost of the catalyst which is employed. It is advantageous, of course, to employ the cheaper forms of catalyst but difficulty has been encountered in providing a sufficient soluble amount of the less expensive catalyst to carry out the epoxidation successfully. The present invention provides a solution to this problem by permitting the use of the inexpensive catalyst forms and providing for the solubilization of these forms to the degree wherein the resulting catalyst solutions find wide utility in the production of oxirane compounds.

It is an object of the invention to provide an improved method for preparing a catalyst solution for use in epoxidations employing aralkyl hydroperoxides as epoxidizing agents, and to the use of the solution in the production of oxirane compounds.

SUMMARY OF THE INVENTION

In accordance with the present invention, inorganic or elemental forms of metals which are effective in the reaction of olefinically unsaturated compounds with hydroperoxides which produce oxirane compounds are admixed with an aralkyl hydroperoxide and maintained for a time and at a temperature effective to produce a solution containing the epoxidation catalyst which solution is well suited for use in the above described production of oxirane compounds.

DESCRIPTION OF PREFERRED EMBODIMENT

In order to facilitate ready understanding of the invention, the following brief description of a particularly preferred embodiment is described.

Example 1

A solution of 2.5% by weight glycerin, 72.5% by weight alpha phenyl ethanol and 25% by weight of a 12% solution of ethylbenzene hydroperoxide in ethylbenzene is placed in a suitable vessel. To 50 grams of this solution there are added 0.75 gram of finely powdered metal molybdenum. The resulting admixture is maintained at a temperature of about 85° C. with agitation for a period of 5 hours. At the end of this time, the resulting solution contains 0.1% molybdenum, in soluble compound form. All of the hydroperoxide has decomposed, primarily to alpha phenyl ethanol.

Two grams of the catalyst solution prepared as above described is charged to a reactor together with 16 grams propylene, 74 grams ethylbenzene, containing a few percent of alpha phenyl ethanol, and 10 grams ethylbenzene hydroperoxide. In the reactor the above mixture is reacted for 1 hour at 120° C. at a pressure of about 500 p.s.i.g. The reaction mixture is found to contain 2.9 grams of propylene oxide.

GENERAL DESCRIPTION OF THE INVENTION

The catalyst metals which are employed in elemental or in inorganic compound form are molybdenum, vanadium, tungsten, titanium, tantalum, columbium, rhenium, selenium, chromium, zirconium, tellurium or uranium. These metals are employed in the form of the powdered metal or as inorganic compounds including the oxides, hydroxides, sulphides, chlorides, oxychlorides, fluorides, phosphates, and the like. Preferred compound forms are the oxides and acids derived from the oxides by hydration.

The solution in which the catalyst is dissolved can comprise the following:

|  | Broad range | Desirable range | Preferred range |
|---|---|---|---|
| Weight percent aralkyl hydroperoxide | 0.1–20 | 0.5–10 | 1.0–5.0 |
| Weight percent aralkanol | 5 to 99 | 20–85 | 65–75 |
| Weight percent solubilizing agent | 0–40 | 1–10 | 2–5 |
| Weight percent aralkane | Balance | Balance | Balancei |

The admixture of catalyst in inorganic or elemental form and hydroperoxide containing solution is maintained at temperatures broadly ranging from 25 to 200° C., desirably 50 to 100° C., and preferably 75 to 90° C. with agitation or other circulation for a time broadly ranging from ¼ to 24 hours, preferably 4 to 6 hours. At the end of this time there is produced a solution containing the catalyst in a dissolved compound form which solution is eminently well suited for the catalytic production of an oxirane compound by reaction of an olefinically unsaturated compound with an aralkyl hydroperoxide.

The aralkyl hydroperoxides are preferably derived from alpha aralkyl hydrocarbons having the general formula

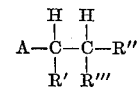

wherein each of R′, R″ and R‴ can be hydrogen or an alkyl radical preferably having 1 to 20 carbon atoms, and A is an aromatic ring. The aromatic ring, A, may be that of benzene and may be substituted with fluoro, chloro, bromo, nitro, alkoxyl, acyl or carboxy (or esters thereof) groups. The ring may have one or more side chains with up to twelve carbon atoms in each chain, which chains may be branched. The alpha aralkyl hydroperoxides have the formula

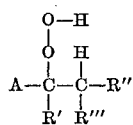

wherein R′, R″, R‴ and A are as above mentioned. Examples are the hydroperoxides of toluene, ethylbenzene, cumene, p-ethyltoluene, isobutylbenzene, tetralin, diisopropylbenzene, p-isopropyltoluene, o-xylene, m-xylene, p-xylene, phenylcyclohexene, and the like. The preferred species are those derived from cumene, i.e., alpha,alpha dimethyl benzyl hydroperoxide, and ethyl benzene, i.e., alpha phenyl ethyl hydroperoxide.

Solubilizing agents are preferably employed in preparing the catalyst solutions of the invention. Suitable solubilizing agents include highly polar compounds of the keto alcohol type, diketones, alcohols such as glycerin, and the like.

For a full description of the epoxidation reactants and reaction conditions as well as the percent of catalyst and the like reference is made to the patents which are above referred to.

Olefinically unsaturated materials which are epoxidized in accordance with the invention include substituted and unsubstituted aliphatic and alicyclic olefins which may be hydrocarbons or esters or alcohols or ketones or ethers or the like. Preferred compounds are those having from about 2 to 30 carbons atoms, and preferably at least 3 carbon atoms. Illustrative olefins are ethylene, propylene, normal butylene, isobutylene, the pentenes, the methyl pentenes, the normal hexenes, the octenes, the dodecenes, cyclohexene, methyl cyclohexene, butadiene, styrene, methyl styrene, vinyl toluene, vinylcyclohexene, the phenyl cyclohexenes, and the like. Olefins having halogen, oxygen, sulfur and the like containing substituents can be used. Such substituted olefins are illustrated by allyl alcohol, methallyl alcohol, cyclohexanol, diallyl ether, methyl methacrylate, methyl oleate, methyl vinyl ketone, allyl chloride, and the like. In general, all olefinic materials epoxidized by method previously employed can be epoxidized in accordance with this process including olefinically unsaturated polymers having up to about several thousand carbon atoms. Illustrative olefins are linseed oil, olive oil, cottonseed oil, tall oil glycerides, castor oil, corn oil, butylpolyglycol esters of unsaturated fatty acids, liquid or solid polybutadiene, polyisoprene, unsaturated copolymers of ethylene and propylene including terpolymers thereof with cyclopentadiene and the like.

The following specific examples will illustrate the invention.

Example 2

A solution containing 85 weight percent alpha methyl benzyl alcohol, 5 weight percent glycerin and 10% of an ethylbenzene oxidate containing 14.2 weight percent ethylbenzene hydroperoxide was heated in the presence of excess molybdenum dioxide at 85° C. for 4 hours. The effluent contained approximately 3000 p.p.m. soluble molybdenum.

Propylene oxide selectivity was similar to that obtained in Example 1 with the above catalyst.

Example 3

Two grams of powdered vanadium metal was treated with a solution of 15% ethylbenzene oxidate (which contained 12 weight percent ethylbenzene hydroperoxide), 3% glycerol and 82% alpha methyl benzyl alcohol at 100° C. for 4 hours with vigorous stirring. About 1000 p.p.m. of soluble vanadium was found in solution.

An epoxidation mixture of 10% ethyl benzene hydroperoxide, 5/1 mol ratio of allyl alcohol to ethylbenzene hydroperoxide, 0.4% vanadium (from above preparation) and ethylbenzene was treated at 110° C. for 15 minutes. The glycidol selectivity was 84 mol percent based on ethylbenzene hydroperoxide and 86 mol percent based on allyl alcohol. The conversions of hydroperoxide and allyl alcohol were >97% and 19%, respectively.

Example 4

Approximately 2 grams of tungsten metal was treated as in Example 1 to give 650 p.p.m. of soluble tungsten.

Application of this catalyst for the epoxidation of butene-1 was as follows: A mixture of seven mol of butene-1 per mol of ethylbenzene hydroperoxide and 150 p.p.m. of soluble tungsten catalyst was treated at 120° C. for 1.6 hours. The selectivity to 1,2-butene oxide was 62 mol percent based on hydroperoxide at 99% hydroperoxide conversion.

I claim:
1. The method of preparing a catalyst solution useful in the reaction of aralkyl hydroperoxide and olefinically unsaturated compounds to produce oxirane compounds which comprises reacting an inorganic compound selected from the group consisting of the oxides, hydroxides, sulphides, chlorides, oxychlorides, fluorides and phosphates of molybdenum, vanadium or tungsten with a liquid aralkyl hydroperoxide at a temperature of 25 to 200° C. for ¼ to 24 hours in the substantial absence of an olefinically unsaturated compound, and recovering a catalyst solution containing a soluble compound of molybdenum, vanadium or tungsten and containing aralkanol which is produced through reaction of said aralkyl hydroperoxide.

References Cited

UNITED STATES PATENTS

| 3,434,975 | 3/1969 | Sheng et al. | 252—431 |
| 2,895,919 | 7/1959 | Gerhart | 252—430 |
| 3,181,991 | 5/1965 | Leveskis | 252—430 |
| 3,350,422 | 10/1967 | Kollar. | |
| 3,351,635 | 11/1967 | Kollar. | |

PATRICK P. GARVIN, Primary Examiner

U.S. Cl. X.R.

252—428, 430; 260—348.5